US006285729B1

(12) United States Patent
Higgins et al.

(10) Patent No.: US 6,285,729 B1
(45) Date of Patent: Sep. 4, 2001

(54) FUEL SPACER/WATER ROD CAPTURE APPARATUS AND METHODS FOR BOILING WATER NUCLEAR REACTORS

(75) Inventors: Russell P. Higgins, Wilmington; David G. Smith, Leland, both of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/306,826

(22) Filed: May 7, 1999

(51) Int. Cl.[7] ................................. G21C 3/32; G21C 3/34
(52) U.S. Cl. ............................ 376/444; 376/441; 376/438
(58) Field of Search ..................................... 376/438, 441, 376/449, 453, 454, 462, 444

(56) References Cited

U.S. PATENT DOCUMENTS

| 4,597,937 | * | 7/1986 | Sakurai et al. | 376/441 |
| 4,686,079 | * | 8/1987 | Ishikawa et al. | 376/444 |
| 5,002,726 | * | 3/1991 | Johansson | 376/448 |
| 5,085,827 | * | 2/1992 | Johansson et al. | 376/444 |
| 5,128,097 | * | 7/1992 | Fukasawa et al. | 376/438 |
| 5,173,252 | * | 12/1992 | Johansson | 376/448 |
| 5,490,192 | * | 2/1996 | Nakajima et al. | 376/441 |
| 5,727,039 | | 3/1998 | Harmon et al. | 376/442 |

* cited by examiner

Primary Examiner—Charles T. Jordan
Assistant Examiner—Kyorytack K. Mun
(74) Attorney, Agent, or Firm—Nixon & Vanderhye

(57) ABSTRACT

The spacer/water rod retention assembly includes a clip secured to the spacer having a slot perimetrically bounded both axially and laterally spaced portions of the clip. A resilient tab projects from one side portion into the slot. A water rod has a projecting tab which, upon relative rotation of the spacer and water rod, engages and deflects the clip tab to enable the water rod tab to reside in the clip slot. When the clip tab returns to its initial position, substantial relative rotation between the water rod and spacer is precluded and axial connection between the spacer and water rod is assured. In another form, the water rod tab projects into a slot of the clip. An adjacent water rod prevents rotation of the water rod tab in the opposite direction, thereby capturing the spacer and water rod and preventing relative axial movement.

11 Claims, 5 Drawing Sheets

FUEL SPACER/WATER ROD CAPTURE APPARATUS AND METHODS FOR BOILING WATER NUCLEAR REACTORS

TECHNICAL FIELD

The present invention relates to apparatus and methods for axially and non-rotationally fixing one or more spacers and a water rod to one another in a nuclear fuel bundle assembly and particularly relates to spacer/water rod capture apparatus and methods for assembly and disassembly of the water rods and spacers.

BACKGROUND OF THE INVENTION

In boiling water nuclear reactors, fuel rods are grouped together in an essentially open-ended tubular flow channel, typically referred to as a fuel assembly or bundle. A plurality of fuel assemblies are positioned in the reactor core in a matrix and a coolant/moderator flows upwardly about the fuel rods for generating steam. The fuel rods are supported in each assembly between upper and lower tie plates. One or more water rods are usually located interiorly within each fuel rod bundle. Spacers are employed at predetermined elevations along each fuel bundle to restrain the fuel rods from bowing or vibrating during reactor operation.

Typical spacers often include a plurality of ferrules arranged in side-by-side relation and secured, for example, by welding to one another to form a support matrix for the fuel rods. Generally, the role of the spacer in a fuel bundle assembly is to maintain the rods in fixed lateral locations relative to one another. These spacers are secured or captured in a manner preventing their movement relative to the longitudinal axis of the bundle during operation of the reactor. Conventional methods of maintaining the fuel rod spacers in position along the axis of the bundle include the use of a pair of tabs welded to the water rods engaging a spacer along its top and bottom, preventing axial movement of the spacer relative to the water rod in either axial direction. These spacers are assembled onto the water rod by relatively rotating the spacers and water rod such that the tabs pass through an opening in the spacer structure. The spacer is then rotated to an orientation such that part of the spacer structure is axially contacting one of the two tabs, the lower tab being preferred. In the assembled bundle, the water rod is typically prevented from rotation by a square lower end plug received in a square hole in the lower tie plate.

There are, however, occasions where the fuel bundle is unchanneled. By unchanneled is meant that the fuel bundle assembly does not have the surrounding channel. For example, the bundles are unchanneled during initial fabrication when the spacers are secured to the water rod. Unchanneled bundles are relatively flexible with respect to torsion about the bundle axis. Thus, twist can occur in unchanneled bundles from normal handling of the bundles. If the twist is large enough, certain of the spacers, e.g., the upper spacers can be rotated to such an extent that the water rod tabs locate over and under the openings in the spacer structure used during assembly and no longer provide axial restraint. Also, for irradiated bundles where the friction forces between the spacer springs and the rod is significantly reduced, the spacers can become axially displaced from their proper location. Further, current designs employ square water rod lower end plugs and square lower tie plate holes to maintain angular orientation of the water rod tab relative to the spacer structure. Such end plugs and holes are costly as compared with round end plugs and holes.

BRIEF SUMMARY OF THE INVENTION

In accordance with the present invention, a spacer and water rod retention or capture assembly is provided in which a single tab on the water rod is captured by spacer structure, preventing relative axial displacement of the spacer and water rod, notwithstanding twisting of the fuel bundle, particularly in the unchanneled configuration. The retention assembly prevents the rotation of the water rod and the tab carried thereby relative to the spacer to the extent the water rod tab cannot be aligned with an opening in the spacer which would otherwise permit relative axial displacement of the spacer and water rod.

In a first preferred embodiment of the present invention, the spacer includes a spacer structure or clip having a central opening bounded perimetrically on axially opposite ends and laterally by opposite side portions. One side portion of the clip includes a tab projecting generally toward the opposite side portion and which tab is resiliently mounted, delimiting the slot opening. The clip, of course, is welded or otherwise secured to the spacer and the slot lies adjacent the water rod position in a plane angularly related to the water rod. Upon locating the water rod in the spacer, the water rod and spacer are relatively rotated such that the water rod tab engages and resiliently displaces the clip tab enabling the water rod tab to pass the clip tab into the slot. The clip tab then resiliently reverts to its original shape. The interference with the resilient tab, together with the obtuse angle of approach of the water rod tab to the clip tab, prevents disengagement of the water rod tab from the spacer. To disassemble the spacer and water rod, a tool can be inserted to deflect the clip tab in the same direction as it is deflected in the initial assembly by the water rod tab whereby the water rod tab can be rotated out of the slot freeing the water rod and clip for relative axial movement.

In a second preferred embodiment of the present invention, the water rod tab is rotated into a slot in the spacer structure whereby one side edge of the slot forms a limit stop for the tab. The water rod tab is prevented from rotating out of the slot by the installation of a second water rod adjacent the first water rod. In the first embodiment, the water rod tab is restrained from rotation by its fit-up with the slot of the spacer clip and in the second embodiment by the spacer clip and an adjoining water rod. In both embodiments, reliance on a square lower end plug and correspondingly shaped tie plate hole to prevent water rod rotation as in certain current spacer/water rod retention assemblies is entirely avoided.

In a preferred embodiment according to the present invention, there is provided in a nuclear fuel bundle having a plurality of generally parallel, axially extending fuel rods, a plurality of spacers for maintaining the fuel rods spaced one from another and at least one water rod extending generally parallel to the fuel rods and passing through the spacers, a spacer and water rod retention assembly, comprising a water rod connecting structure carried by at least one of the spacers and having a slot bounded by opposite structure portions spaced axially from one another and a pair of oppositely disposed side structure portions between the axially spaced structure portions, the structure portions perimetrically enclosing the slot, the structure including a spring tab projecting from one structure portion toward another structure portion delimiting the slot, one water rod having a tab projecting laterally outwardly thereof and disposed in the slot, the water rod tab having an axial extent for engaging the axially opposite structure portions to limit relative movement of one spacer and water rod in opposite axial directions, the tab and another structure portion of the spacer structure confining the water rod tab in the slot precluding substantial relative rotational movement between one spacer and water rod.

In a further preferred embodiment according to the present invention, there is provided in a nuclear fuel bundle having a plurality of generally parallel, axially extending fuel rods, a plurality of spacers axially spaced from one another for maintaining the fuel rods spaced laterally from one another, and a pair of water rods extending in generally side-by-side parallel relation to the fuel rods and passing through the spacers, a spacer and water rod retention assembly, comprising a water rod connecting structure carried by one of the spacers and having a slot bounded by opposite structure portions spaced in an axial direction from one another and a pair of oppositely disposed side structure portions between the axially opposite portions perimetrically enclosing the slot, the slot substantially spanning between the water rods, one of the water rods having a tab projecting laterally outwardly thereof and into the slot, the tab having an axial extent engaging the axially opposite structure portions to limit relative axial movement of one spacer and one water rod, another of the water rods and one of the side structure portions confining the water rod tab in the slot precluding substantial relative rotational movement between one spacer and one water rod.

In a still further preferred embodiment according to the present invention, there is provided in a nuclear fuel bundle having a plurality of spacers for maintaining fuel rods spaced one from another, and at least one water rod extending axially and generally perpendicular to and through the spacers, a method of retaining the spacer on the water rod, comprising the steps of relatively rotating the one water rod and one of the spacers to engage a tab projecting laterally outwardly of one water rod against a deflectable tab carried by a clip on the one spacer and in part delimiting a perimetrically enclosed slot in the clip and further relatively rotating one water rod and one spacer to resiliently deflect the clip tab from an initial position and displace the water rod tab past the deflected clip tab for engaging the water rod tab in the slot with resilient return of the clip tab to the initial position thereby limiting relative movement of one spacer and one water rod in opposite axial directions and precluding substantial relative rotational movement between one water rod and one spacer.

In a still further preferred embodiment according to the present invention, there is provided in a nuclear fuel bundle having a plurality of spacers for maintaining fuel rods spaced one from the other and a pair of water rods extending axially and generally perpendicular to and through the spacers, a method of retaining the spacer on one of the water rods, comprising the steps of relatively rotating one of the water rods and one of the spacers to dispose a tab projecting laterally outwardly of one water rod into a slot carried by a clip on the one spacer, providing a stop along one side of the slot of the clip to preclude continued rotation of the tab and clip relative to one another and installing another of the water rods adjacent one water rod adjacent the clip to preclude relative rotation of the one water rod and the spacer in a direction removing the tab from the slot whereby relative movement of one spacer and one water rod in opposite axial directions and substantial relative rotational movement between one water rod and one spacer are precluded.

DETAILED DESCRIPTION OF THE INVENTION

Figure 1:
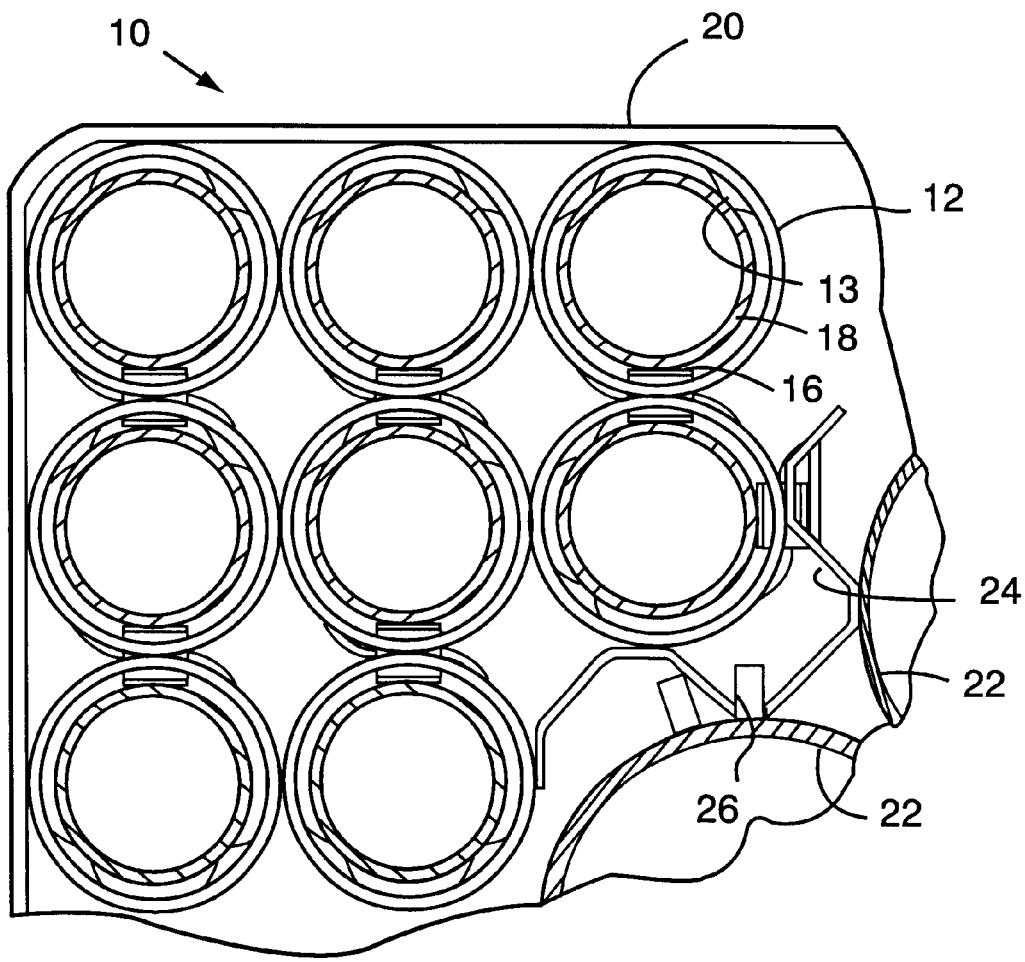
FIG. 1 is a fragmentary plan view of a portion of a spacer and a water rod illustrating a pair of axially spaced tabs on the water rod for capturing the spacer and water rod together in accordance with the prior art.

Referring now to the drawings, particularly to FIG. 1, there is illustrated a spacer for use in a fuel bundle or assembly in a nuclear reactor, the spacer being generally designated 10. The spacer includes a plurality of cylindrical ferrules 12 having stops 13 projecting from interior wall surfaces thereof and springs 16 for bearing against fuel rods 18 extending through the spacer in each of the ferrules 12. The springs 16 impart a lateral force to the fuel rods to maintain the fuel rods in bearing engagement against the stops 13. The spacer 10 also has a surrounding band 20 laterally encompassing the ferrules.

As illustrated, a pair of water rods 22 pass through enlarged openings in the spacer 10. A clip 24 is secured to the ferrules, for example, by welding, and has a vertical extent corresponding to the vertical extent of the ferrules. One of the water rods 22 carries upper and lower tabs 26 which engage upper and lower margins, respectively, of the clip 24 to prevent relative axial displacement of the spacer and one water rod. As previously stated, in unchanneled bundles, the twist of the water rods and spacers may be sufficient to misalign the tabs 26 with the clip, enabling the spacer and water rod for relative axial displacement.

Figure 2A:
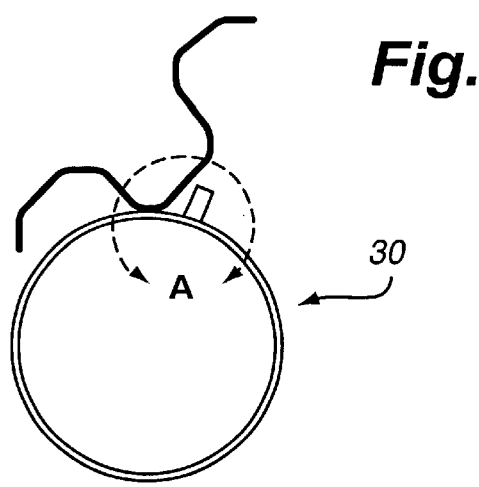
FIG. 2A is a schematic illustration of the orientation of a water rod and spacer clip showing the position of the water rod tab before assembly.
Figure 2B:
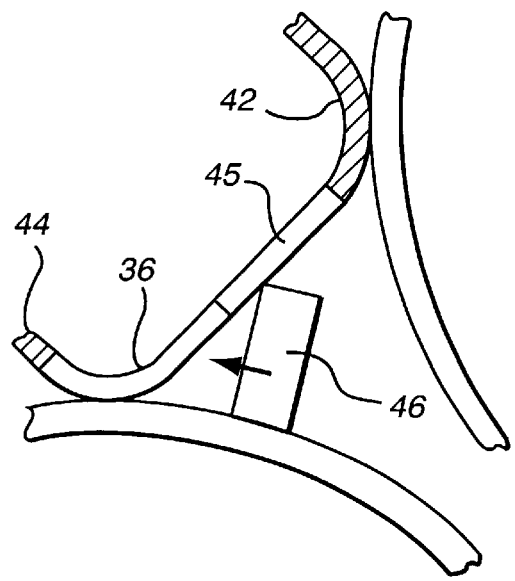
FIG. 2B is an enlarged fragmentary cross-sectional view illustrating the clip and water rod tab prior to their assembly.
Figure 2C:
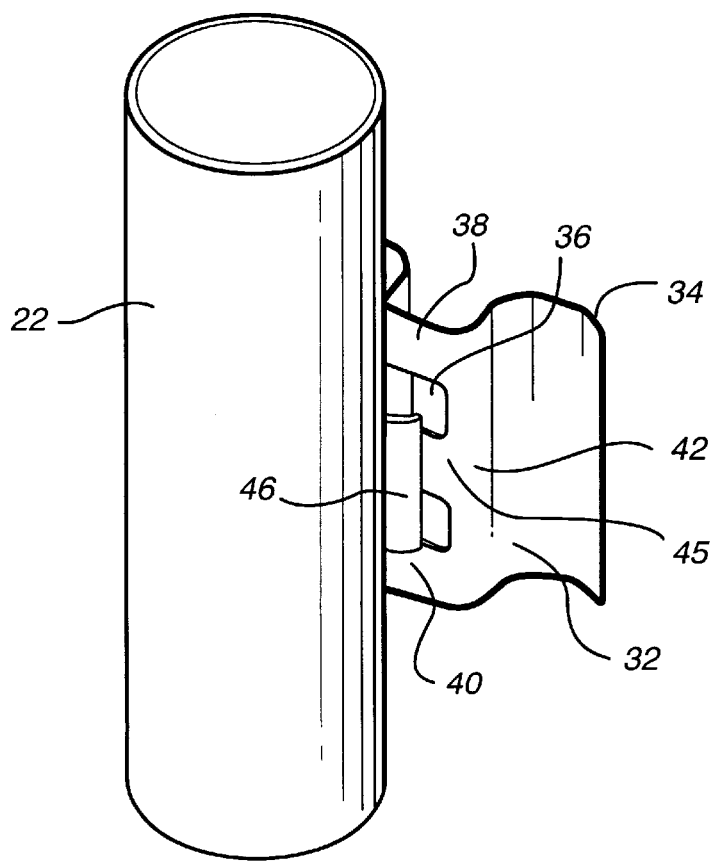
FIG. 2C is a perspective view illustrating the water rod tab and clip prior to assembly.

Referring to FIGS. 2A–2C, there is illustrated in a preferred form of the present invention, a spacer/water rod connecting structure or retention assembly, generally designated 30, for use in a spacer of the type illustrated in FIG. 1 but having a different clip and water rod retention tab arrangement, as will now be explained. As best illustrated in FIG. 2C, the clip 32 is generally U-shaped with laterally outwardly directed flanges 34 to facilitate welding to adjoining ferrules 12 (FIG. 1). The base of the U-shaped clip 32 defines a slot or opening 36 bounded by axially opposite structural portions 38 and 40, as well as lateral or side structural portions 42 and 44 (FIG. 2B). Thus, the portions 38, 40, 42 and 44 perimetrically enclose the slot 36.

Along the side portion 42 of clip 32, there is provided a clip tab 45 which projects toward the opposite side portion 44 of slot 36. The metal material from which the clip 32 is made enables the clip tab 45 to be resiliently deflected. A water rod tab 46 projects generally radially outwardly from the water rod and is sized for reception in the slot 36.

To secure the spacer and water rod relative to one another, the water rod is disposed through the opening in the spacer with the tab 46 outside of the opening or slot 36 as illustrated in FIG. 2B. By rotating the spacer and water rod relative to one another, for example, by rotating the water rod in a counterclockwise direction as illustrated in FIG. 2B, the water rod tab 46 engages the tab 45 of the clip 32, resiliently deflecting tab 45 such that the water rod tab 46 obtains the position illustrated in FIG. 38 within slot 36. The clip tab 45, once the water rod tab 46 passes by out of engagement with tab 45 and into slot 36, resiliently deforms back to its initial position, generally within the slot 36. As a consequence, the side portion 44 of clip 32 and tab 45 lie on opposite sides of the water rod tab 46, preventing relative rotation between the spacer and water rod. Even with a twist of an unchanneled fuel bundle assembly, the water rod tab 46 remains captured in the slot between the side portion 44 and clip tab 45. To disassemble the water rod and spacer, a tool, not shown, may be used to deflect the spring in the same direction as in the initial assembly whereby the tab 46 can be rotated out of the slot past the tab 45.

Referring now to the embodiment of the present invention illustrated in FIGS. 4A–4B and 5A–5C, wherein like reference numerals as in the prior embodiment apply to like parts followed by suffix "a," the water rod 22a includes a tab 46a. The clip 32a includes a slot 36a which is perimetrically bounded by axially opposite end portions 38a and 40a, as well as bounded on its sides by side portions 50 and 52. The clip 32a is secured to the spacer similarly as in the prior embodiment. In this form, however, the tab 45 projecting from one side portion of the clip is omitted.

To secure the spacer and one water rod against axial displacement relative to one another, the tab 46a is rotated into the slot 36a by relative rotation of the spacer and water rod. The tab 46a is thus prevented from rotational movement by one side portion 50 of the slot 36a. To prevent rotational movement of the tab in a direction displacing the tab from the slot, a second water rod 23 is disposed through an opening in the spacer adjacent the first water rod. The second water rod prevents rotation of the tab out of the slot 36a. The water rod does not rely on a square lower end plug and tie plate hole to prevent water rod rotation as in certain current designs. Thus, the present spacer/water rod retention assembly not only prevents relative rotation of the water rod and spacer to an extent permitting axial displacement of the water rod and spacer, particularly when installed in unchanneled fuel bundle assemblies, but also permits the less costly fabrication of a round water rod end plug and round openings in the lower tie plate of the fuel assembly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear fuel bundle having a plurality of generally parallel, axially extending fuel rods, a plurality of spacers for maintaining the fuel rods spaced one from another and at least one water rod extending generally parallel to said fuel rods and passing through said spacers, a spacer and water rod retention assembly, comprising:

a water rod connecting structure carried by at least one of said spacers and having a slot bounded by opposite structure portions spaced axially from one another and a pair of oppositely disposed side structure portions between said axially spaced structure portions, said axially spaced structure portions and said side structure portions perimetrically enclosing said slot, said structure including a spring tab projecting from one structure portion toward another structure portion delimiting the slot;

said one water rod having a tab projecting laterally outwardly thereof and disposed in said slot, said water rod tab having an axial extent for engaging said axially opposite structure portions to limit relative movement of said one spacer and said water rod in opposite axial directions, said spring tab and said another structure portion of said spacer structure confining said water rod tab in said slot precluding substantial relative rotational movement between said one spacer and said water rod.

2. An assembly according to claim 1 wherein said spring tab is deflectable against a bias thereof in a direction away from said one water rod to enable said water rod tab to pass into said slot upon relative rotation of said spacer and water rod tab and to return to an unbiased position delimiting said slot restraining displacement of said water rod tab out of said slot upon relative rotation of said spacer and water rod tab.

3. An assembly according to claim 1 wherein said spring tab projects from one side structure portion toward an opposite side structure portion.

4. An assembly according to claim 1 wherein said spacer comprises a plurality of spacer ferrules, said water rod connecting structure comprising a clip secured to at least a pair of said ferrules adjacent said water rod, said clip having a generally U-shape in an axial direction with flanges projecting laterally from ends of the U-shaped clip for securing the clip to said adjacent ferrules, said slot at least in part being formed in a base of said U-shaped clip.

5. An assembly according to claim 1 wherein said water rod tab comprises the sole water rod tab engageable with said water rod connecting structure to limit relative movement of said one spacer and said water rod in opposite axial directions.

6. In a nuclear fuel bundle having a plurality of generally parallel, axially extending fuel rods, a plurality of spacers for maintaining the fuel rods spaced one from another and at least one water rod extending generally parallel to said fuel rods and passing through said spacers, a spacer and water rod retention assembly, comprising:

a water rod connecting structure carried by at least one of said spacers and having a slot bounded by opposite structure portions spaced axially from one another and a pair of oppositely disposed side structure portions between said axially spaced structure portions, said structure including a spring tab projecting from one structure portion toward another structure portion delimiting the slot;

said one water rod having a tab projecting laterally outwardly thereof and disposed in said slot, said water rod tab having an axial extent for engaging said axially opposite structure portions to limit relative movement of said one spacer and said water rod in opposite axial directions, said spring tab and said another structure portion of said spacer structure confining said water rod tab in said slot precluding substantial relative rotational movement between said one spacer and said water rod.

7. An assembly according to claim 6 wherein said spring tab is deflectable against a bias thereof in a direction away from said one water rod to enable said water rod tab to pass into said slot upon relative rotation of said spacer and water rod tab and to return to an unbiased position delimiting said slot restraining displacement of said water rod tab out of said slot upon relative rotation of said spacer and water rod tab.

8. An assembly according to claim 6 wherein said spring tab projects from one side structure portion toward an opposite side structure portion.

9. An assembly according to claim 6 wherein said spacer comprises a plurality of spacer ferrules, said water rod connecting structure comprising a clip secured to at least a pair of said ferrules adjacent said water rod, said clip having a generally U-shape in an axial direction with flanges projecting laterally from ends of the U-shaped clip for securing the clip to said adjacent ferrules, said slot at least in part being formed in a base of said U-shaped clip.

10. An assembly according to claim 6 wherein said water rod tab comprises the sole water rod tab engageable with said water rod connecting structure to limit relative movement of said one spacer and said water rod in opposite axial directions.

11. In a nuclear fuel bundle having a plurality of spacers for maintaining fuel rods spaced one from another, and at least one water rod extending axially and generally perpendicular to and through said spacers, a method of retaining said spacer on said water rod, comprising the steps of:

relatively rotating said one water rod and one of said spacers to engage a tab projecting laterally outwardly of said one water rod against a deflectable tab carried by a clip on the one spacer and in part delimiting a perimetrically enclosed slot in said clip; and further relatively rotating said one water rod and said one spacer to resiliently deflect the clip tab from an initial position and displace the water rod tab past the deflected clip tab for engaging the water rod tab in said slot with resilient return of said clip tab to said initial position thereby limiting relative movement of said one spacer and said one water rod in opposite axial directions and precluding substantial relative rotational movement between said one water rod and said one spacer.

* * * * *

UNITED STATES PATENT AND TRADEMARK OFFICE
CERTIFICATE OF CORRECTION

PATENT NO. : 6,285,729 B1  
DATED : September 4, 2001  
INVENTOR(S) : Higgins et al.

Page 1 of 1

Figure 3A:
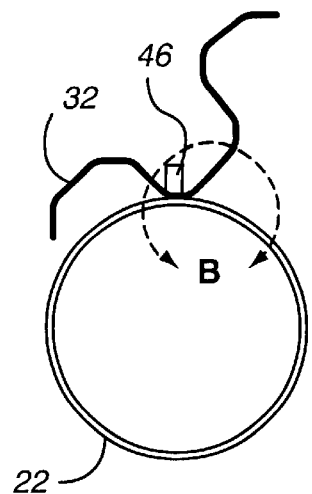
FIGS. 3A, 3B and 3C are views substantially corresponding to FIGS. 2A, 2B and 2C, respectively, illustrating the retention assembly after relative rotation of the spacer and water rod into an assembled condition.
Figure 3B:
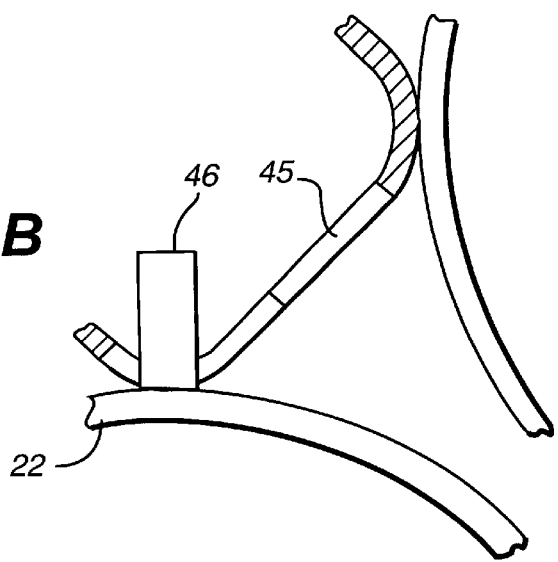
Figure 3C:
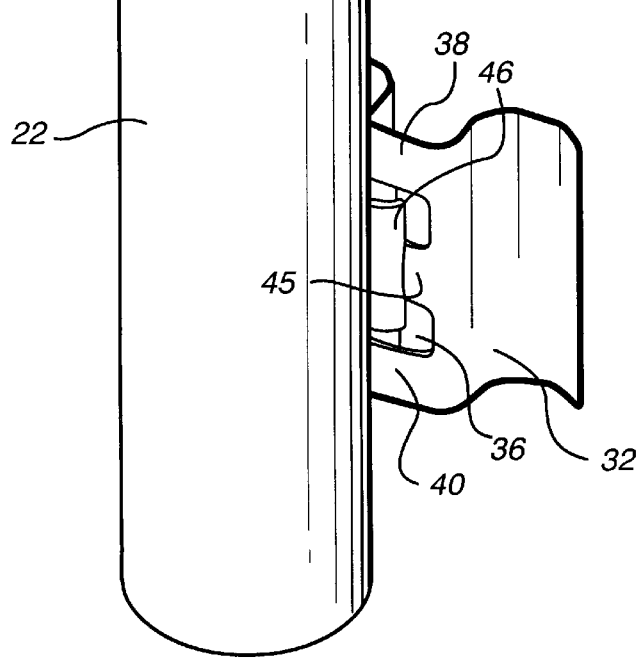
Figure 4A:
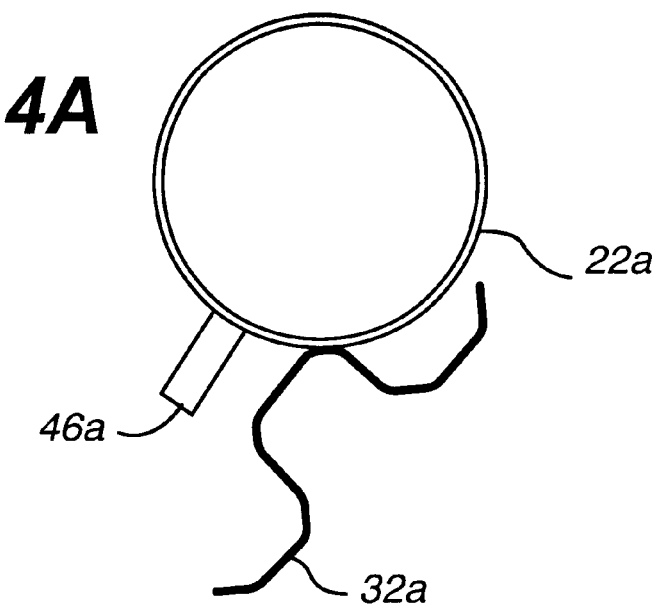
FIG. 4A is a schematic illustration of relative portions of a water rod tab and spacer clip prior to assembly according to a second preferred embodiment of the present invention.
Figure 4B:
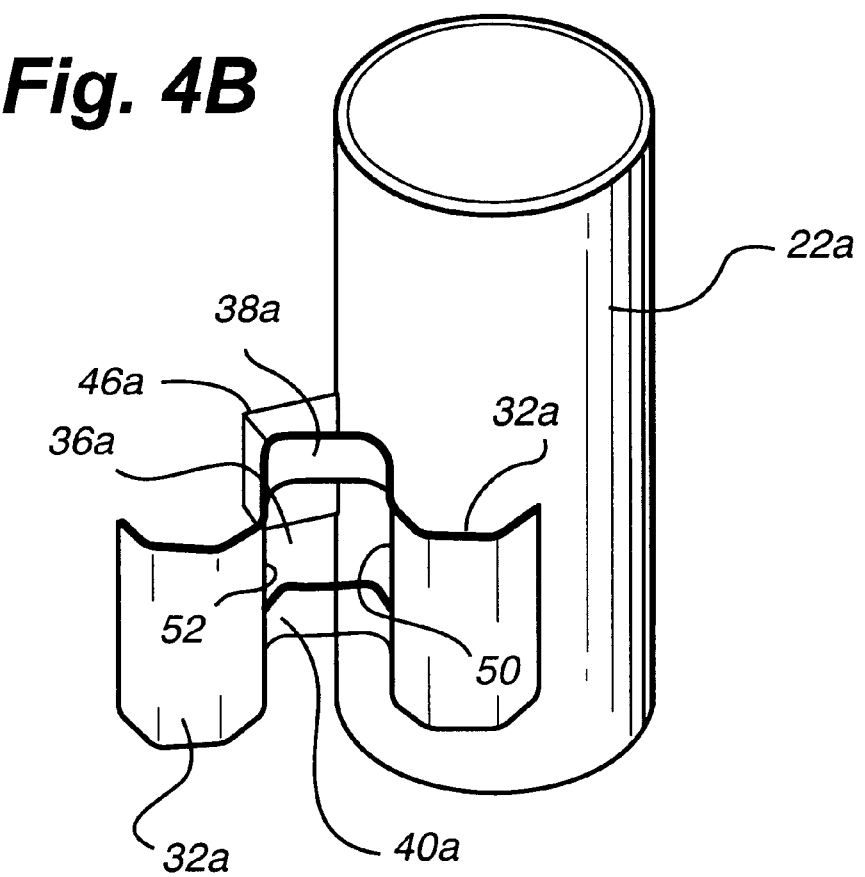
FIG. 4B is a perspective view of the water rod tab and spacer clip illustrated in FIG. 4A.
Figure 5A:
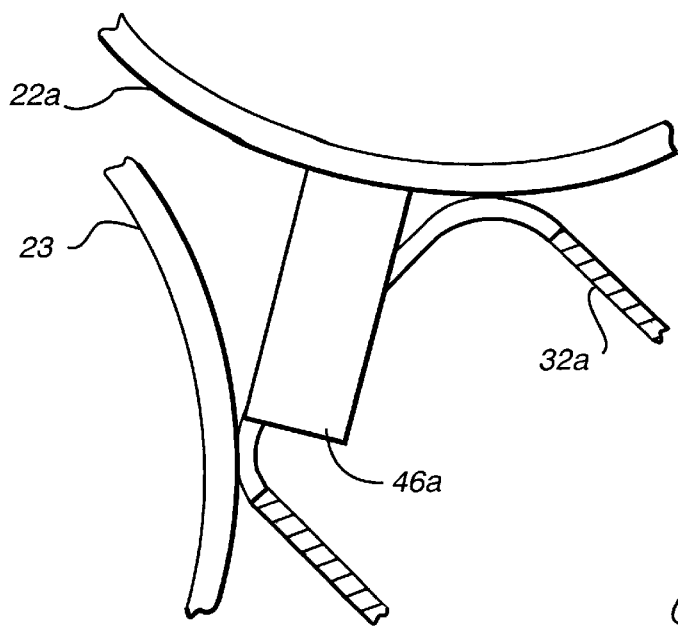
FIG. 5A is a enlarged fragmentary cross-sectional view illustrating the position of the water rod tab, adjacent water rod and spacer clip after rotation and assembly.
Figure 5B:
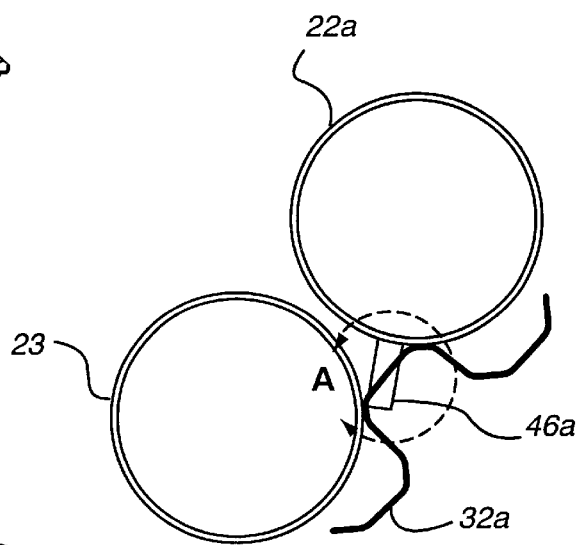
FIG. 5B is a view similar to FIG. 5A on a reduced scale illustrating in plan the position of the clip relative to the two water rods after assembly.
Figure 5C:
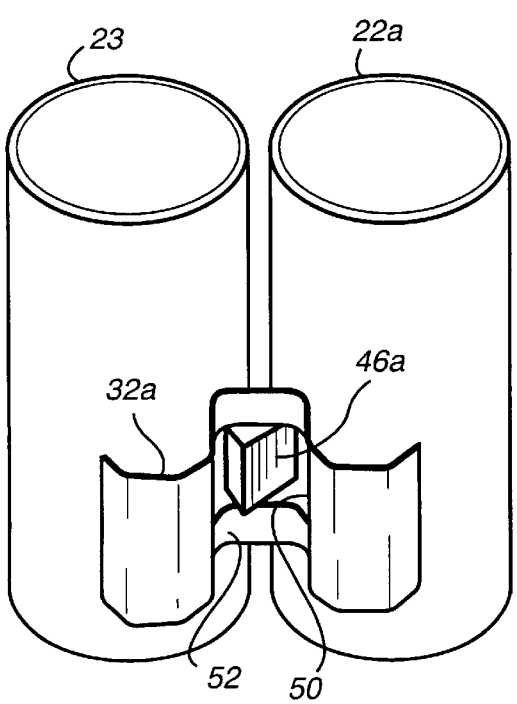
FIG. 5C is a perspective view of the water rod tab fully assembled with the spacer clip and lying adjacent a second water rod.

It is certified that error appears in the above-identified patent and that said Letters Patent is hereby corrected as shown below:

<u>Column 5,</u>  
Line 15, delete "FIG. 38" and insert -- FIG. 3B --.

Signed and Sealed this

Twenty-first Day of May, 2002

Attest:

Attesting Officer

JAMES E. ROGAN  
*Director of the United States Patent and Trademark Office*